(12) United States Patent
Köllmann et al.

(10) Patent No.: US 6,558,717 B1
(45) Date of Patent: May 6, 2003

(54) METHOD FOR THE SEQUENTIAL PRECIPITATION OF CASEIN AND CALCIUM PHOSPHATE FROM A MILK SOURCE

(75) Inventors: Clemens Johannes Willibrordus Köllmann, Veghel (NL); Gerard Willem Hofland, Leiden (NL); Lucas Antonius Maria Van Der Wielen, Bleiswijk (NL); Geert-Jan Witkamp, Bergschenhoek (NL)

(73) Assignee: Campina B.V. (NL)

( * ) Notice: Subject to any disclaimer, the term of this patent is extended or adjusted under 35 U.S.C. 154(b) by 0 days.

(21) Appl. No.: 09/729,647

(22) Filed: Dec. 4, 2000

(51) Int. Cl.[7] .......................... A23C 12/00; A23C 9/12; C07K 1/00; A23J 1/20; A61K 38/16
(52) U.S. Cl. ........................... 426/41; 426/34; 514/12; 530/360; 530/366; 530/414; 435/272
(58) Field of Search ............................ 514/12; 530/366, 530/322, 414, 360; 426/41; 435/272

(56) References Cited

U.S. PATENT DOCUMENTS 4,519,945 A * 5/1985 Ottenhof ..................... 260/119

OTHER PUBLICATIONS

Fluka Chemical Catolog, pp. 318. 320 and 338, 1997/1998.*
Tomasula, P.M. et al., "Preparation of Casein Using Carbon Dioxide", Journal of Dairy Science, vol. 78, pp. 506–514, 1995.*
Gevaudan, S. et al., "Effects of Treatment by Gaseous Carbon Dioxide on the Colloidal Phase of Skim Milk", Journal of Dairy Science, vol. 79, pp. 1713–1721, 1996.*
Hofland et al., " Isoelectric Precipitation of Casein Using High– Pressure CO2", Industrial & Engineering Chemistry Research vol. 38, No. 12, pp. 4919–4927, 1999.*
de la Fuente " Changes in the mineral balance of milk submitted to technologiacl treatment", Trends in Food Science & Technology, vol. 9, pp. 281–288, 1998.*

* cited by examiner

Primary Examiner—Lynette R. F. Smith
Assistant Examiner—Khatol Shahnan-Shah
(74) Attorney, Agent, or Firm—Webb Ziesenheim Logsdon Orkin & Hanson, P.C.

(57) ABSTRACT

A method for isolating casein and calcium phosphate as separate products from a milk source, comprising the steps of: a) contacting the milk source with carbon dioxide under pressure in order to precipitate the casein; b) separating the casein from the milk source while maintaining the pressure to obtain a casein fraction and a whey fraction; and c) releasing the pressure from the whey fraction to allow calcium phosphate to precipitate therefrom.

18 Claims, 3 Drawing Sheets

METHOD FOR THE SEQUENTIAL PRECIPITATION OF CASEIN AND CALCIUM PHOSPHATE FROM A MILK SOURCE

FIELD OF THE INVENTION

The present invention relates to a method for isolation of casein and calcium phosphate from a milk source.

BACKGROUND OF THE INVENTION

The recovery of proteins usually requires auxiliary materials to separate and purify the protein. The separation of proteins can be a complex task which may involve several unit operations and consume substantial amounts of auxiliary compounds like acids and bases, that are released as a by-product in the form of salts. In the precipitation of food proteins, this is a considerable environmental burden, due to the large volumes processed.

A number of food proteins, particularly casein and soy protein, are isolated in large volumes by isoelectric precipitation at pH values of 4.5–4.8, using mineral acids such as hydrochloric or sulfuric acid. It is estimated that food protein precipitation processes like this lead to a waste stream of salts of approximately 64 kilotons per year in Europe alone.

In addition to acid precipitation (acid casein) casein can be isolated by enzymatic treatment (rennet casein). Lactic acid fermentation is another well-known option. Organic acids have been used as well, but are nowadays less common. Most of the acid casein is converted to sodium, potassium, magnesium, or ammonium caseinates, depending on the application.

Casein is not a single protein but a group of proteins, comprising four major fractions: $\alpha_{s1}$ casein, $\alpha_{s2}$ casein, $\beta$ casein, and $\kappa$ casein. They have in common an isoelectric point around pH 4.6. Besides casein, skimmed milk contains a large amount of lactose, the whey proteins among which $\alpha$-lactalbumin and $\beta$-lactoglobulin, certain peptides, salts like calcium phosphate, and several minor components.

Although we are not bound here to a particular theory regarding the structure of a casein micelle, there is a model as described by Walstra and Jenness. Dairy Chemistry and Physics; Marcel Dekker; New York (1994) that is very illustrative. Casein molecules associate into casein micelles, aggregates of 20–200 nm. A schematic representation of the structure is shown in FIG. 1. Within these casein micelles 10 even smaller structures can be identified, so-called submicelles 12 (10–20 nm), which are held together by colloidal "bridges" 14 of calcium phosphate connecting phosphatized serine groups in the proteins. Protruding chains 16 are bound to the surfaces of the submicelles 12. Besides calcium phosphate, also other components are involved in these bridges 14, among which are magnesium and citrate. Conversely, calcium is not only bound to the protein via these bridges but also by association with negatively charged groups, along with other cations. During acid precipitation, the calcium phosphate dissolves, as a consequence of which the bridges are broken and the micelle structure is lost. In addition, associated cations are exchanged for protons. For manufacturers of casein, it is important that the dissolution and ion exchange are complete, so that the final product, the caseinate of concern, does not contain residual calcium and phosphate, which strongly influence functional properties, such as emulsifying and water binding properties, and viscosity.

Instead of mineral acids, a volatile acid as carbon dioxide can be used, with the advantage of being easily removed by pressure release. Isoelectric precipitation of proteins with carbon dioxide is thus an alternative to conventional acid precipitation as to reduce the amount of inorganic acids and bases used in recovery processes of food- and biochemicals; like casein. However, also here relatively high calcium concentrations are found in the casein end product (Jordan et al., N.Z.J. Dairy Sci. Technol. 22, 247–256 (1987); Tomasula et al., J. Dairy Sci. 78, 506–514 (1995); and Tomasula et al., J. Food Eng. 33, 405–419 (1997)). Furthermore, the functional properties thereof differ from conventional acid casein (Strange et al., J. Dairy Sci. 81, 1517–1524 (1998)).

Besides casein, another component from milk, calcium phosphate, is a highly appreciated ingredient in many calcium enriched food products, since it is derived from a natural dairy source. It is therefore desirable to also be able to obtain calcium phosphate from milk in a substantially pure form.

OBJECT OF THE INVENTION

In view of the above, it is the object of the present invention to provide a method for preparing casein from a milk source while using a lower amount of inorganic acids and bases than used in conventional casein recovery processes, in which method the casein after isolation does not comprise a considerable amount of calcium phosphate. It is a further object of the invention to provide a means for (re)crystallizing weak electrolytes in general and calcium phosphate in particular, in a controlled manner without adding auxiliary compounds.

SUMMARY OF THE INVENTION

The above defined objects are achieved according to the invention by a method for isolating casein and calcium phosphate as separate products from a milk source, comprising the steps of:

a) contacting the milk source with carbon dioxide under pressure in order to precipitate the casein;

b) separating the casein from the milk source while maintaining the pressure to obtain a casein fraction and a whey fraction;

c) releasing the pressure from the whey fraction to allow calcium phosphate to precipitate therefrom.

DETAILED DESCRIPTION OF THE INVENTION

It was found that a carbon dioxide pressure of at least 35 bar, preferably at least 60 bar leads to a pH of about 4.8 at which casein is precipitated while calcium phosphate is dissolved. The precipitated casein can then be removed without being contaminated with a considerable amount of calcium phosphate. Casein thus obtained can be washed with CO2 pressurized water which results in a relatively dry product. Because of the low amount of water adhering to the casein, less washing steps are needed compared to a regular aqueous acidification/washing process.

After removal of casein (herein called the "casein fraction"), still under pressure, a whey fraction remains that contains most of the calcium phosphate. Precipitation of calcium phosphate does not occur when the pressure does not drop below 7 bar. Removal of calcium phosphate from the whey can be achieved by reducing the carbon dioxide pressure to a value below 7 bar. At 7 bar carbon dioxide pressure, the pH is still about 5.5. At a pH above about 5.5 at further pressure release the calcium phosphate will precipitate. Completely releasing the carbon dioxide pressure will lead to a pH of 7.3.

In summary, upon removal of casein the carbon dioxide pressure is such that the pH of the milk source is between 4.5 and 5.0, preferably between 4.6 and 4.8. It was found that a carbon dioxide pressure of at least 35 bar, more preferably at least 60 bar is necessary to obtain a pH of 4.8.

In order to further optimize the process mineral acid may be added to further lower the pH of the milk source to the pI of casein, i.e. 4.6. This will allow for an even further removal of calcium phosphate from the final casein product. Thus, the pH of the milk source for precipitating casein is 4.5–4.9, preferably 4.6–4.8, more preferably 4.6.

Alternatively, the pH of 4.6 is achieved by dilution of the milk source. When the skim milk is diluted, or when concentrated milk is used, the carbon dioxide pressure should be adjusted accordingly to obtain the correct pH, as a person skilled in the art will know. A carbon dioxide pressure of at least 10 bar is preferred.

Calcium phosphate may be precipitated in an amorphous or crystalline form. The latter form is preferred and can be obtained by carefully controlling the pressure release, temperature and/or by adding crystallization seeds to the whey fraction. Such seeds are for example seeds of brushite ($CaHPO_4.2H_2O$).

The milk source that serves as a starting product in the method of the invention can be selected from the group consisting of skimmed milk, whole milk, concentrated (e.g. evaporated) milk, reconstituted milk (made from milk powder and water), ultrafiltered milk, demineralized milk, etc.

Figure 1:
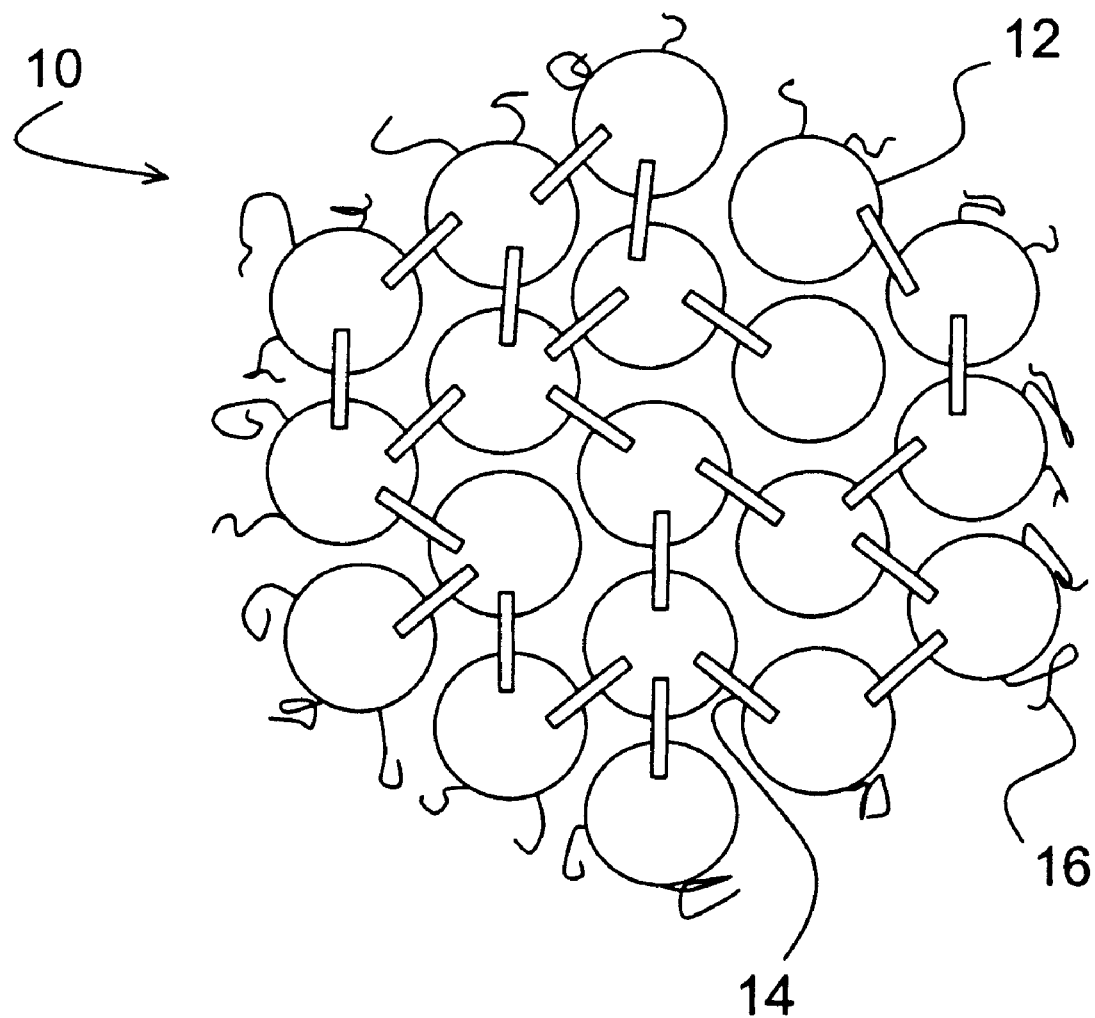
FIG. 1 is a schematic representation of the structure of a casein micelle.
Figure 2:
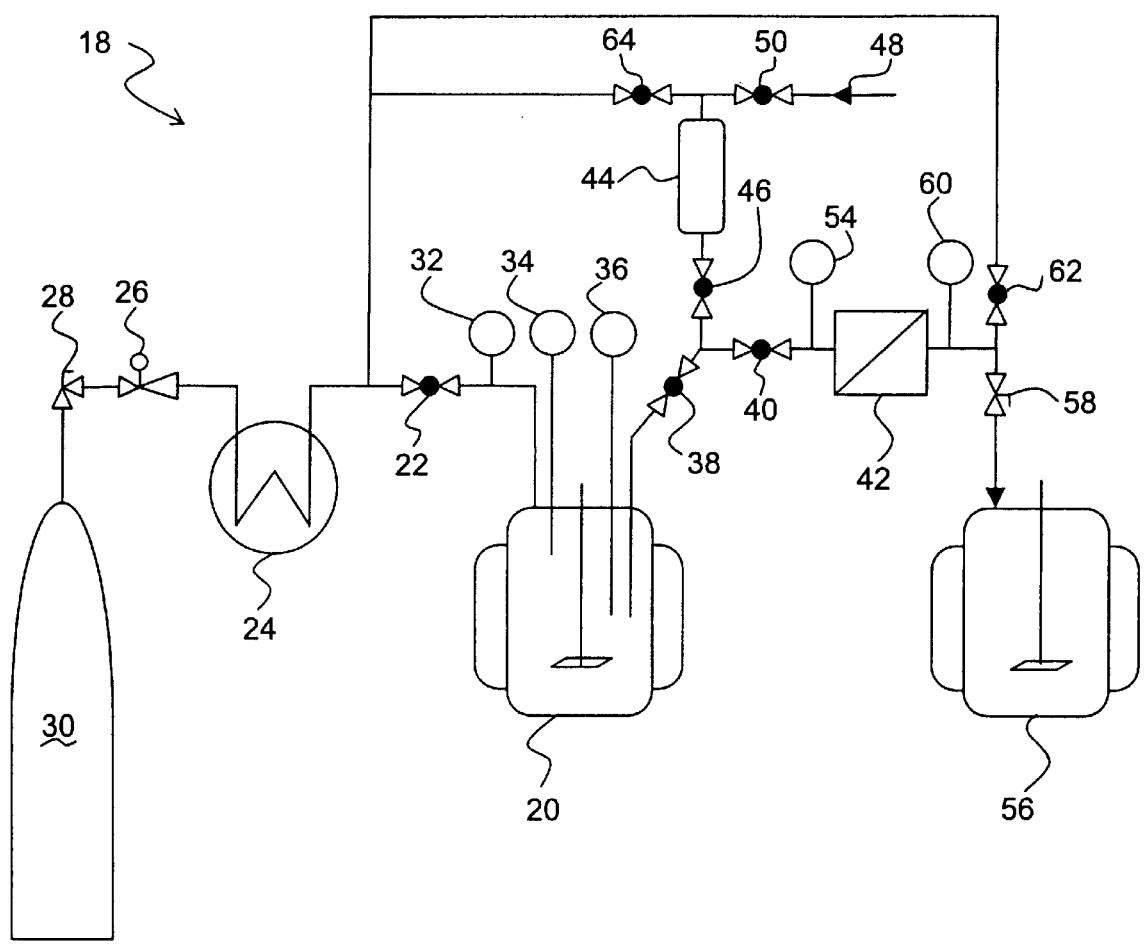
FIG. 2 is a schematic representation of an apparatus for the practice of the present invention.

FIG. 2 is a schematic representation of an apparatus for the practice of the present invention. A high pressure vessel 20 is placed in fluid contact, though a first valve 22, a heat exchanger 24, a pressure reducer 26 and a $CO_2$ valve 28, with a source of $CO_2$ 30. A first pressure gauge 32, a thermometer 34 and a pH meter 36 provide readings of the contents of the high-pressure vessel. The high-pressure vessel is in fluid communication, through a second valve 38 and a third valve 40, with a candle filter 42. A washing vessel 44 is in fluid communication, through a fourth valve 46, with the volume between the second valve 38 and the third valve 40. Water is introduced from a water source 48 by a water valve 50 to the washing vessel 44. A second pressure gauge 54 provides readings from the volume between the third valve 40 and the candle filter 42. A low pressure vessel 56 is in fluid communication, through a fifth valve 58, with the candle filter 42. A third pressure gauge 60 provides readings from the volume between the fifth valve 58 and the candle filter 42. A sixth valve 62 links the volume between the candle filter 42 and the fifth valve 58 with the volume between the heat exchanger 24 and the first valve 22. A seventh valve 64 links the volume between the washing vessel 44 and the water valve 50 with the volume between the heat exchanger 24 and the first valve 22.

Figure 3:
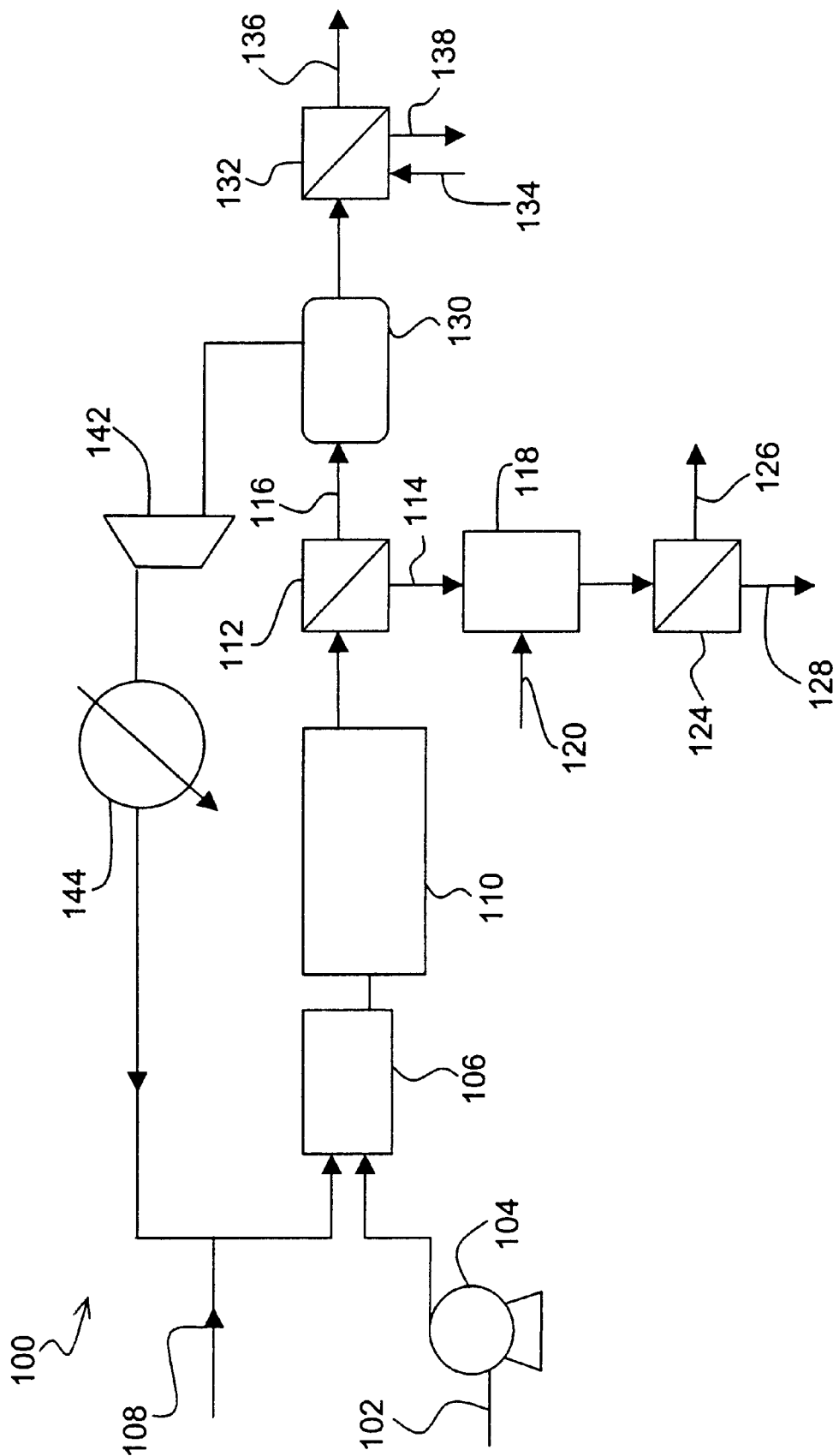
FIG. 3 is a schematic representation of the process flow for the sequential precipitation of casein and calcium phosphate according to the present invention.

FIG. 3 shows a flow sheet for the sequential precipitation of casein and calcium phosphate of the invention. This figure also represents an example of the equipment that may be used for performing the method of the invention.

FIG. 3 depicts the process 100 of the present invention. A quantity of defatted milk 102 undergoes pumping 104 and subjected to a mixing step 106 for mixing with carbon dioxide 108, then to a casein precipitation step 110. The product removed from the casein precipitation volume is introduced into a first solids separation step 112, which produces both a casein fraction 114 and a whey fraction 116. The casein fraction is combined in a combination step 118 with a washing liquor 120; the product of this combination is subjected to a second solids separation step 124, yielding product washing liquor 126 and casein 128. The whey fraction 116 is subjected to pressure release 130, then to a third solids separation step 132 with the introduction of strip air 134 to produce both whey 136 and calcium phosphate 138. Carbon dioxide produced in the pressure release step is subjected to recompression 142 and cooling 144 and is combined with carbon dioxide for introduction into the mixing step.

Prevention of the precipitation of calcium phosphate at wrong spots in the equipment is an important issue in the process design. It was calculated that it required 7 bars carbon dioxide pressure to prevent the whey pH to rise above 5.5. Precipitation of calcium phosphate can therefore be prevented by designing the filtration and depressurization steps in such a way that pressure does not drop below 7 bar. Alternatively, the temperature can be kept low to prevent calcium phosphate precipitation. The precipitation of calcium phosphate is described to only start above 40° C. In the precipitation with carbon dioxide low values of calcium and phosphate in the whey after depressurization are only observed for 40° C., not for 25° C.

The invention further relates to the casein obtained by means of the method and the calcium phosphate thus obtained. Furthermore, the invention relates to casenate (sodium, calcium, potassium, etc.) obtained by neutralizing casein with alkali.

The present invention will be further illustrated in the example that follows. Variations may be made in the process steps described therein. The scope of the invention is solely defined by the claims.

EXAMPLE

EXPERIMENTAL SET-UP

The method of the present invention was demonstrated using high pressure equipment shown in FIG. 2. Reconstituted milk was made by dissolving low-heat skim milk powder in demineralized water in a ratio of 1 to 9. The high pressure vessel (Buchiglass, Uster, CH) was charged with 750 g of reconstituted milk.

After thermal equilibration (50° C.), the reconstituted milk was pressurized with carbon dioxide (technical grade) to a final pressure of 56 bar. Before entering the vessel, the carbon dioxide was passed through a helical coil heat exchanger in order to raise the temperature. During the pressurization, the stirring rate was kept at 500 rpm to ensure an acidification time less than 5 min in order to form particles with a sufficiently large particle size. After the acidification, an extra 20 minutes were allowed for aging and release of calcium phosphate from the casein particles.

Casein and whey were collected using an in-line candle filter of sintered stainless steel (Headline, Kent, UK). The mean pore size was 3 μm. Before transferring the casein-whey slurry over the filter, the filter section was pressurized to 56 bar with carbon dioxide as well. The pressure difference was kept below 5 bar using a needle valve to prevent the compressible casein particles to be pressed through the filter. The whey which was depressurized over a needle valve, was transferred to a second low pressure vessel. The casein precipitate that was gathered on the filter was obtained in relatively dry form because the dense expanding carbon dioxide was able to displace the whey particularly well. Optionally, the casein solids were washed by transferring water pressurized with carbon dioxide over the filter.

The whey solution that was transferred to the second stirred vessel was gently stirred (200 rpm) to remove the residual carbon dioxide gas from the solution, which allowed calcium phosphate to further precipitate. The temperature of the second vessel was kept at 50° C. Slurry samples that were taken were analyzed on chemical composition.

RESULTS AND DISCUSSION

After precipitation of the casein at high pressure, the whey was collected by passing the slurry at high pressure over a filter with pore size 3 μm.

After depressurization the pH of the whey was 6.05, but it rose quickly to 6.25 and further to 6.45 and 6.76. By bubbling air through the solution to remove residual carbon dioxide, the pH rose to 7.15. During the process the turbidity of the mixture increased, Centrifugation increased the pH even to 7.28.

Analysis of the liquid phase shows the calcium phosphate concentration decreased in the course of time (Table 1).

TABLE 1

Yield of calcium phosphate as a function of pH of carbon dioxide whey

| pH before centr. | pH after centr. | Ca* [ppm] | *[ppm] | $(Ca/P)_s$ [mol/mol] | $\left(\frac{Ca + Mg}{P}\right)_s$ [mol/mol] | Removal Ca + $PO_4$ | Yield Ca + $PO_4$ |
|---|---|---|---|---|---|---|---|
| milk |  | 1312 | 796 | — | — | 0% |  |
| whey |  | 1122 | 766 | — | — | 7% | 0% |
| 6.05 | 6.3 | 964 | 697 | 1.36 | 1.52 | 17% | 11% |
| 6.25 | 6.49 | 430 | 406 | 1.48 | 1.56 | 55% | 52% |
| 6.45 | 6.72 | 359 | 369 | 1.48 | 1.58 | 60% | 57% |
| 6.76 | 6.975 | 297 | 334 | 1.48 | 1.57 | 65% | 62% |
| 7.15 | 7.283 | 257 | 311 | 1.47 | 1.57 | 68% | 65% |

*concentration in liquid phase

The experiment shows that it is possible to retrieve 65% of the calcium phosphate from the whey after depressurization. The purity of the precipitate can be further optimized.

CONCLUSION

By increasing the pH of the whey by reducing pressure in carbon dioxide induced precipitation. A large part of the calcium phosphate could be removed from solution. The maximum pH that was obtainable after release of carbon dioxide pressure was found to be 7.3. Simple increase of pH gave an amorphous product with a relatively low purity. The purity can be improved by adding seeds of brushite and better control of the pressure and temperature profile.

The pH in the process of the invention is still relatively high (pH 4.9 at 50° C.) which still leaves part of the calcium phosphate behind in the casein preparation. In order to obtain complete removal of calcium phosphate from the casein during the precipitation of the casein mineral acid can be added in the precipitation step or the skim milk can be diluted.

What is claimed is:

1. A method for isolating casein and calcium phosphate as separate products from a skim milk source, comprising the steps of:
    a) contacting the skim milk source with carbon dioxide under pressure in order to precipitate the casein;
    b) separating the casein from the skim milk source while maintaining the pressure to obtain a casein fraction and a whey fraction; and
    c) increasing the pressure from the whey fraction, thereby increasing the pH of the whey fraction to at least 6.05 to allow calcium phosphate to precipitate therefrom.

2. The method as claimed in claim 1, wherein the carbon dioxide pressure is such that the pH of the skim milk source is between about 4.5 and 5.0.

3. The method as claimed in claim 1, wherein the carbon dioxide pressure in step a) is at least about 35 bar.

4. The method as claimed in claim 1, wherein the carbon dioxide pressure in step b) is greater than about 7 bar.

5. The method as claimed in claim 1, wherein the carbon dioxide pressure in step c) lies below about 7 bar.

6. The method as claimed in claim 1, wherein the pH of the skim milk source for precipitating casein is about 4.5–4.9.

7. The method as claimed in claim 1, wherein for precipitating calcium phosphate crystallization seeds are added to the whey fraction.

8. The method as claimed in claim 7, wherein the crystallization seeds are seeds of brushite ($CaHPO_4 \cdot 2H_2O$).

9. The method as claimed in claim 1, wherein the skim milk source is selected from the group consisting of skimmed milk, concentrated (e.g. evaporated) milk, reconstituted milk, ultrafiltered milk, and demineralized milk.

10. The method as claimed in claim 1, wherein the carbon dioxide pressure is such that the pH of the skim milk source is between 4.6 and 4.8.

11. The method as claimed in claim 1, wherein the carbon dioxide pressure is such that the pH of the skim milk source is 4.6.

12. The method as claimed in claim 1, wherein the carbon dioxide pressure in step a) is at least 60 bar.

13. The method as claimed in claim 1, wherein the carbon dioxide pressure in step b) is at least 10 bar.

14. The method as claimed in claim 1, wherein the carbon dioxide pressure in step c) lies below 1 bar.

15. The method as claimed in claim 11, wherein the pH of 4.6 is achieved by either or both of the addition of mineral acid and dilution of the skim milk source.

16. The method as claimed in claim 1, further comprising neutralizing the casein fraction with alkali.

17. The method as claimed in claim 1, further comprising deriving a caseinate from the casein fraction.

18. The method as claimed in claim 1, further comprising isolation of calcium phosphate in a crystalline form.

* * * * *